Aug. 7, 1951          E. N. CLARK          2,563,580

MAP HOLDING DEVICE

Filed Aug. 3, 1949

INVENTOR.
EARL NORWOOD CLARK,
BY
Allen & Allen
ATTORNEYS.

Patented Aug. 7, 1951

2,563,580

UNITED STATES PATENT OFFICE 2,563,580

MAP HOLDING DEVICE

Earl Norwood Clark, Middletown, Ohio

Application August 3, 1949, Serial No. 108,250

6 Claims. (Cl. 40—86)

My invention relates to improvements in map holding devices, for use in automobiles and other vehicles.

It is an object of my invention to provide a map holding device which, while small, will permit a large portion of the map held therein to be seen at any given time.

Another object of my invention is to provide a map holding device of novel shape which can be easily and quickly moved from one place to another and which can be conveniently operated while in a variety of positions.

A further object of my invention is to provide a novel map holding device which can be used at night conveniently and with a relatively large area of the map exposed to view.

Other objects and advantages of the invention will be apparent during the course of the following description.

Figure 1:
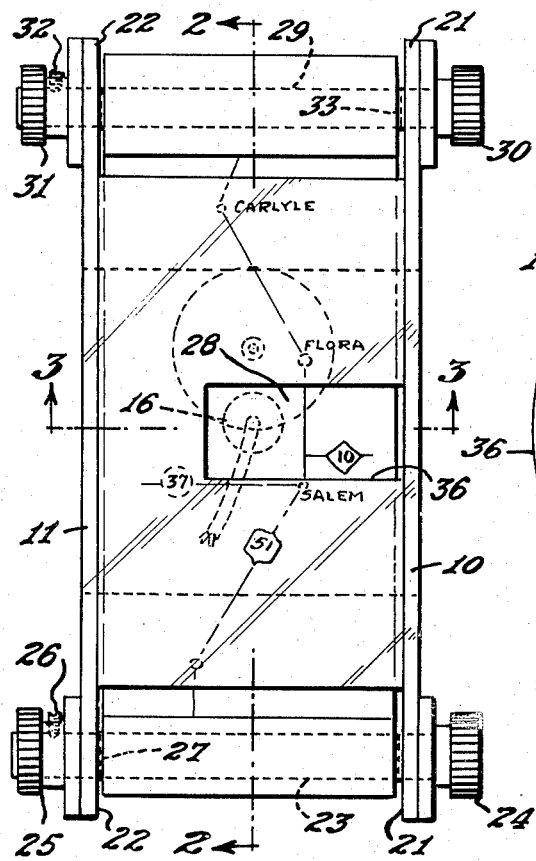
Figure 2:
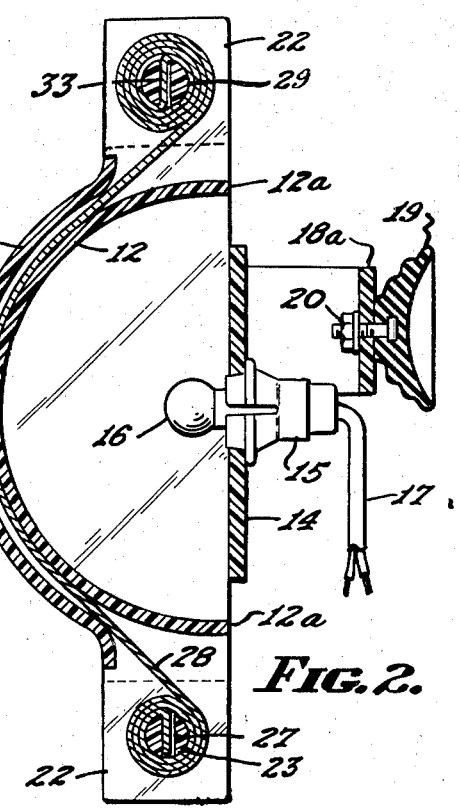
Figure 3:
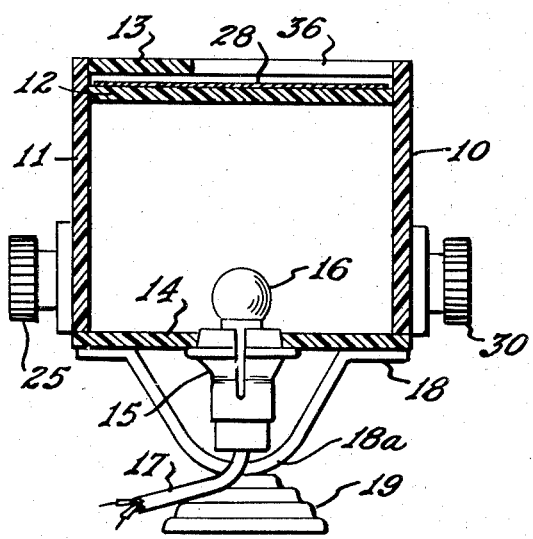
Figure 4:
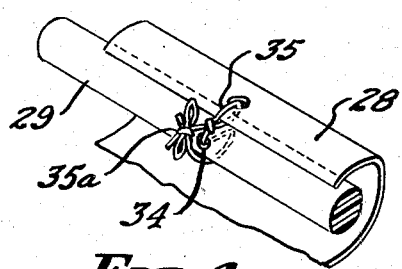

In the accompanying drawings, forming a part of this application, and in which like numerals are employed to designate like parts throughout the same, Figure 1 is a plan view of the map holding device, Figure 2 is a longitudinal section taken on the line 2—2 of Figure 1, Figure 3 is a cross section taken on the line 3—3 of Figure 1, Figure 4 is a perspective view of one of the map winding shafts illustrating another way in which the map may be easily fastened to the shaft.

In the drawings, wherein for the purpose of illustration is shown a preferred embodiment of my invention, the numerals 10 and 11 designate side members joined by inner and outer semi-cylindrical transparent elements 12 and 13 respectively. These members and elements are preferably made of some transparent plastic such as Lucite or the like, although actually only the elements 12 and 13 must be transparent. It is preferred that said inner element 12 be so formed as to represent substantially a half of a cylinder having a diameter of at least two inches, although it may be possible to construct smaller devices if desired. Said outer element should be so formed as to over-lie a substantial portion of said inner element. The reasons for this construction will become apparent later.

A base plate 14 extends across the bottom edges of the side members 10 and 11. The base plate 14 and the semi-cylindrical elements 12 and 13 are permanently adhered to the side members 10 and 11 by any suitable means such as a suitable adhesive, the mode of such attachment not forming a novel part of this invention.

Positioned in the plate 14 is a socket 15 provided with a light 16. The wire 17 may be connected to any suitable source of electric current in order to supply the light 16. Fixed to the plate 14 is a bracket 18 having a looped portion 18a on which a suction cup 19 is suitably mounted, as for example, by means of the nut and screw arrangement indicated generally at 20.

It should be noted that my map holding device consists of a pair of side members 10 and 11 having their central portions raised and curved to just nicely make a flush contact with the side edges of the outer semi-cylindrical element 13 which is held therebetween as best seen in Figure 3. Throughout the full length of the member 13 its edges contact the uppermost portions of the side elements 10 and 11 and form therewith an exterior surface which is smooth and unmarred by projecting ridges. The side edges of the inner element 12, spaced from the outer element 13, also contact the inner surface of the side members 10 and 11 and are secured thereto as noted above. The bottom plate 14 may extend across the members 10 and 11 as shown in Figure 3, or it could be held therebetween as are the elements 12 and 13.

The side members 10 and 11 are formed with projecting end portions 21 and 22 respectively. A shaft 23 is journaled in one pair of extensions 21 and 22. Fixed to one end of the shaft 23 is a knob 24 by which the shaft 23 may be caused to rotate. At its other end the shaft 23 is maintained in the extensions 21 and 22 by means of a knob 25 adjustably positioned on said shaft and provided with a set screw 26. The shaft 23 may be provided with a horizontal slit 27 through which one end of a strip map 28 may be threaded in order that it may be wound on said shaft by turning the knob 24 or 25.

A shaft 29 is journaled in the other pair of extensions 21 and 22. At one end it is provided with a knob 30 fixed thereto and at its other end it is provided with an adjustable knob 31 provided with a set screw 32. The shaft 29 may be provided with a slit 33 in the same manner as is the shaft 23 so that the strip map 28 may be fastened thereto. Thus the map may be moved through the holder by turning any of the four knobs 24, 25, 30 and 31.

In Figure 4 I have shown another way in which the map 28 may be secured to the shafts 23 and 29. In this arrangement I simply provide a hole 34 in the shaft 29, for example, through which a string 35, fastened to the map 28, may be passed and knotted as at 35a. It is to be understood that this arrangement may be repeated for the shaft 23 if desired.

The extended portions 21 and 22 of the side members 10 and 11 are preferably slightly flexible so that a suitable friction engagement may be obtained by the proper positioning of the movable knobs 25 and 31 with respect to the members 10 and 11. By means of the set screws 26 and 32 these knobs may be so set that they can be easily turned by one using the device but also so that there is sufficient friction between the side members and the knobs to prevent the map from unwinding of its own accord. This requirement of slight resiliency may be readily met by constructing the side members 10 and 11 of suitable plastic material.

The shafts 23 and 29 should be so journaled in the extensions 21 and 22 that a plane passed through the center line of said shafts will pass through the semi-cylindrical member 12 substantially near its ends 12a. This arrangement provides for a maximum exposure to view of the map 28 when it is placed in the device and inserted between the semi-cylindrical elements 12 and 13. By having the outer element 13 over-lie a substantial portion of the inner element 12 the map 28 is given maximum protection when in its operative position within the device.

In my arrangement I may also provide a window or cut-away portion 36 in the member 13. This opening enables the user to make notations on the map as to the matter of travel time between cities, good hotels, interesting events and the like. The element 12 provides an excellent base for the map so that such notes may be made quite clearly and easily.

In operation, then, one of the shafts 23 or 29 having the map 28 fastened thereto and rolled up on it is placed between a pair of the extensions 21 and 22 and the corresponding adjustable knob fixed in position. The free end of the map 28 is then inserted between the members 12 and 13 and pushed through until it may be grasped and secured to the other of the two shafts. After the knobs 25 and 31 have been correctly positioned the map may be moved through the device by turning any of the knobs 24, 25, 30 and 31. The light 16 assures that the device may be conveniently used at night as well as during the day and the suction cup 19 makes it possible to use the device in a wide variety of places. The slight friction obtained between the side members 10 and 11 and the various knobs maintains the map in position.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims. By way of example a sliding cover could be provided for the window 36, or, if desired, the window could be omitted entirely. Also, the side members 10 and 11, the base 14 and the bracket 18 do not have to be made of transparent material.

Having thus described my invention, what I claim as new and desire to secure by Letters Patent is:

1. In a map holding device and the like: a frame comprising two side members and a bottom plate attached therebetween, each of said side members having a raised, arcuate shaped, central portion; an inner, substantially semi-cylindrical, transparent element fixed between said side members; an outer, partly-cylindrical, transparent element fixed between said side members and spaced from said inner member, said outer member contacting said arcuate shaped portions so as to provide a said device having a smooth exterior surface free of projections; and a pair of rolls for moving a strip map or the like between the said spaced, partly-cylindrical elements, one of said rolls being positioned at either end of said frame.

2. The device of claim 1 in which said bottom plate, on its side facing said inner element, is provided with a socket for receiving a light bulb.

3. The device of claim 1 in which a portion of said outer element is removed so that notes may be made on said map, said inner element thus constituting a writing base.

4. The device of claim 1 in which said partly-cylindrical, outer element overlies a substantial portion of said semi-cylindrical, inner element.

5. The device of claim 1 in which a plane passed through the center lines of said rolls will pass through said inner element near its ends.

6. In a map holding device and the like: a frame comprising two side members and a bottom plate attached therebetween, each of said side members having a raised, arcuate shaped, central portion; an inner, substantially semi-cylindrical, transparent element fixed between said side members; an outer, partly-cylindrical, transparent element fixed between said side members and spaced from said inner member, said outer member contacting said arcuate shaped portions so as to provide a said device having a smooth exterior surface free of projections; said partly-cylindrical, outer element being arranged to overlie a substantial portion of said semi-cylindrical, inner element; a portion of said outer element being removed so that notes may be made on said map, said inner element thus constituting a writing base; said bottom plate, on its side facing said inner element, being provided with a socket for receiving a light bulb; and a pair of rolls for moving a strip map or the like between the said spaced, partly-cylindrical elements, one of said rolls being positioned at either end of said frame, said rolls being so arranged that a plane passed through the center line of each of said rolls will pass through said inner element near its ends.

EARL NORWOOD CLARK.

REFERENCES CITED

The following references are of record in the file of this patent:

UNITED STATES PATENTS

| Number | Name | Date |
|---|---|---|
| 1,175,992 | Reilly | Mar. 21, 1916 |
| 1,244,743 | Joseph | Oct. 30, 1917 |
| 1,309,841 | Carmichael | July 15, 1919 |
| 1,760,785 | Sledge | May 27, 1930 |
| 1,844,542 | Cook | Feb. 9, 1932 |
| 2,501,840 | Bradford | Mar. 28, 1950 |